(12) United States Patent
Asver et al.

(10) Patent No.: US 9,008,466 B2
(45) Date of Patent: Apr. 14, 2015

(54) SHARING OR APPLYING DIGITAL IMAGE EDITING OPERATIONS

(71) Applicant: Google Inc., Mountain View, CA (US)

(72) Inventors: Ajmal Arshan Asver, San Francisco, CA (US); Chandrashekar Raghavan, San Francisco, CA (US); Denise Ho, Los Altos, CA (US); Darwin Yamamoto, San Francisco, CA (US)

(73) Assignee: Google Inc., Mountain View, CA (US)

( * ) Notice: Subject to any disclaimer, the term of this patent is extended or adjusted under 35 U.S.C. 154(b) by 125 days.

(21) Appl. No.: 13/840,373

(22) Filed: Mar. 15, 2013

(65) Prior Publication Data

US 2014/0133782 A1    May 15, 2014

Related U.S. Application Data

(60) Provisional application No. 61/724,878, filed on Nov. 9, 2012.

(51) Int. Cl.
*G06K 9/03*    (2006.01)
*H04N 1/40*    (2006.01)

(52) U.S. Cl.
CPC ... *G06K 9/03* (2013.01); *H04N 1/40* (2013.01)

(58) Field of Classification Search
CPC . G06F 3/04842; G06F 3/0481; G06F 3/0488; H04L 51/00; H04L 51/32

USPC ......... 382/118, 103, 156, 305, 309; 715/753, 715/201; 709/204, 203
See application file for complete search history.

(56) References Cited

U.S. PATENT DOCUMENTS

| 2004/0044732 | A1 | 3/2004 | Fushiki et al. | |
|---|---|---|---|---|
| 2005/0030315 | A1 | 2/2005 | Cohen et al. | |
| 2010/0241611 | A1 | 9/2010 | Zuber | |
| 2011/0202424 | A1* | 8/2011 | Chun et al. | 705/26.8 |
| 2013/0238724 | A1* | 9/2013 | Cunningham | 709/206 |
| 2013/0332512 | A1* | 12/2013 | Roman et al. | 709/203 |
| 2014/0050419 | A1* | 2/2014 | Lerios et al. | 382/276 |

* cited by examiner

*Primary Examiner* — Ali Bayat
(74) *Attorney, Agent, or Firm* — McDermott Will & Emery LLP

(57) ABSTRACT

The disclosed subject matter relates to computer implemented methods for sharing digital image edit operations. In one aspect, a method includes storing a first digital image edit stack, which includes at least one digital image edit operation performed by a first user of a social network upon a first digital image hosted on the social network. The method further includes receiving indication of a first request for the first digital image edit stack, based upon an operation performed by a second user of the social network. The method further includes providing the digital image edit stack for the second user, in response to the received indication.

15 Claims, 7 Drawing Sheets

SHARING OR APPLYING DIGITAL IMAGE EDITING OPERATIONS

CROSS-REFERENCES TO RELATED APPLICATIONS

The present application claims the benefit of U.S. Provisional Patent Application Ser. No. 61/724,878, titled "Sharing or Applying Digital Image Editing Operations," filed on Nov. 9, 2012, which is hereby incorporated by reference in its entirety for all purposes.

BACKGROUND

A user may have digital images. However, the user may not be proficient with a digital image editing application to perform digital image edit operations upon the digital images.

SUMMARY

The disclosed subject matter relates to a computer-implemented method for sharing digital image edit operations. The method includes storing a first digital image edit stack, which includes at least one digital image edit operation performed by a first user of a social network upon a first digital image hosted on the social network. The method further includes receiving indication of a first request for the first digital image edit stack, based upon an operation performed by a second user of the social network. The method further includes providing the digital image edit stack for the second user, in response to the received indication.

The disclosed subject matter further relates to a system for editing a digital image. The system includes a memory which includes instructions for editing a digital image, and a processor. The processor is configured to execute the instructions to store a first digital image edit stack, which includes at least one digital image edit operation performed by a first user upon a first digital image. The processor is further configured to receive indication of a first request for the first digital image edit stack, based upon an operation performed by a second user having access to the first digital image edit stack. The processor is further configured to perform the digital image operation of the first digital image stack, upon a second digital image, in response to the received indication of the first request.

The disclosed subject matter further relates to a machine-readable storage medium including machine-readable instructions for causing a processor to execute a method for sharing digital image edit operations. The method includes storing a first digital image edit stack, which includes at least one digital image edit operation performed upon a first digital image. The method further includes receiving via a social network, indication of a first request for the first digital image edit stack. The method further includes providing the first digital image edit stack, via the social network, in response to the received indication of the first request.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

A digital image editing application provides the ability to perform digital image edit operations upon photographs. A user proficient with such a digital image editing application can perform digital image edit operations to create visual effects in a digital image that increase the digital image's visual appeal. On the other hand, it would be more difficult and tedious for a user not proficient with the digital image editing application to create the same visual effects.

The subject disclosure describes systems and techniques for sharing and/or applying digital image edit operations to one or more digital images.

Figure 1:
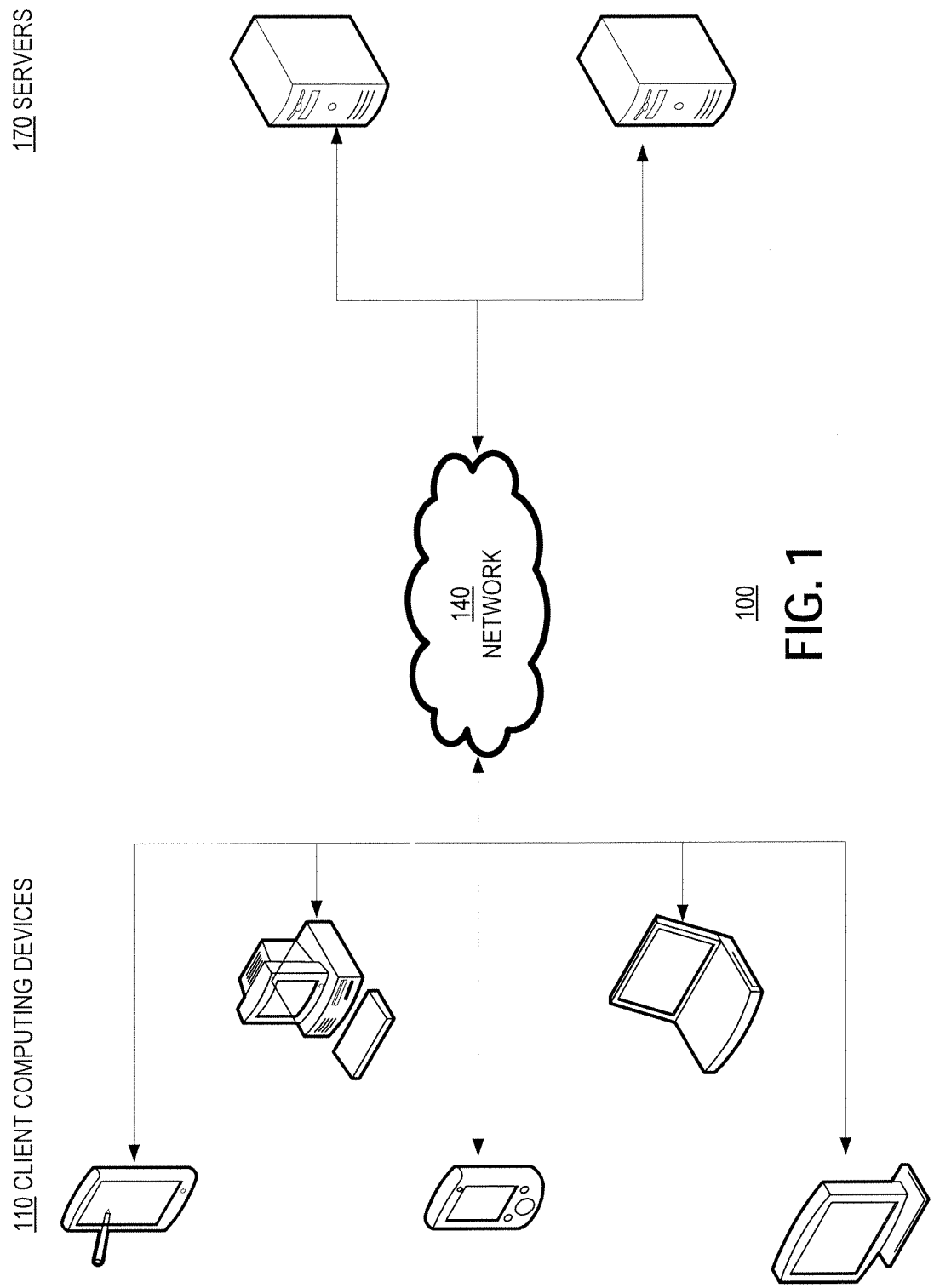
FIG. 1 illustrates an example of an architecture for sharing digital image edit operations.

FIG. 1 illustrates an example of an architecture 100 for sharing digital image edit operations. The architecture 100 includes client computing devices 110 and servers 170 connected over a network 140.

The client computing devices 110 can be, for example, mobile computers, tablet computers, mobile devices (e.g., a smartphone or PDA), desktop computers, set top boxes (e.g., for a television), video game consoles, or any other devices having processing capabilities, communications capabilities, and memory.

The network 140 can include any one or more of the Internet, a personal area network (PAN), a local area network (LAN), a campus area network (CAN), a metropolitan area network (MAN), a wide area network (WAN), a broadband network (BBN), and the like. Further, the network 140 can include, but is not limited to, any one or more of the following network topologies, including a bus network, a star network, a ring network, a mesh network, a star-bus network, tree or hierarchical network, and the like.

Inputs (e.g., pointer input, touch-based gestures, keystrokes) received from an input device can be processed locally on the client computing device 110 to which the input device is attached. Alternatively, if the data generated by the input device is provided to one of the many servers 170, the data can be processed on one of the many servers 170. For purposes of load balancing, data and software instructions may be stored and/or processed on multiple servers 170.

The servers 170 can be, for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for load balancing) across multiple servers.

According to certain aspects of the disclosure, a first user of a first client computing device 110 can share digital image edit operations with a second user of a second client computing device 110 over the network 140. For example, while on vacation together, the first user and the second user may capture digital images using their digital cameras, smartphones, and so on. Upon returning from the vacation, the first user, who is particularly skilled in photography and digital image editing, may edit his digital images to enhance their appearance. The digital image edit operations performed by the first user can include, for example, adjusting white balance, sharpness, contrast, and/or color. The digital image edit operations performed by the first user can be stored as a stack of digital image edit operations, which may be referred to herein as a digital image edit stack. In some aspects, the edit operations may be performed according to an order in which the operations are stacked. In some aspects, the digital image edit stack may be stored in any suitable format that would provide instructions for performing the digital edit operations (e.g., as a script file, a digital image editing application file, a macros, a text file, a zip file, etc).

The first user can share the digital image edit stack, together with the digital images, with the second user. For example, the first user can use the first client computing device 110 to perform the digital image edit operations, store the digital image edit operations as a digital image edit stack, and upload the digital image edit stack and digital images, over the network 140, to a social network hosted by the servers 170. The second user may be able to view the digital images edited by the first user on the social network using the second client computing device 110. The second user, who may not be as skilled with digital image processing as the first user, may desire to make the same adjustments to his own photographs (e.g., of the same scenery or location). In this regard, an option may be provided to the second user (e.g., when the second user is viewing the first user's digital images on the social network) to apply the same digital image edit stack to the second user's own photographs, which may be stored on the second client computing device 110 and/or on the servers 170 (e.g., the second user's own photographs may be uploaded to the social network). In response to the second user selecting such an option, the servers 170 may apply the digital image edit stack to the second user's photographs.

Figure 2:
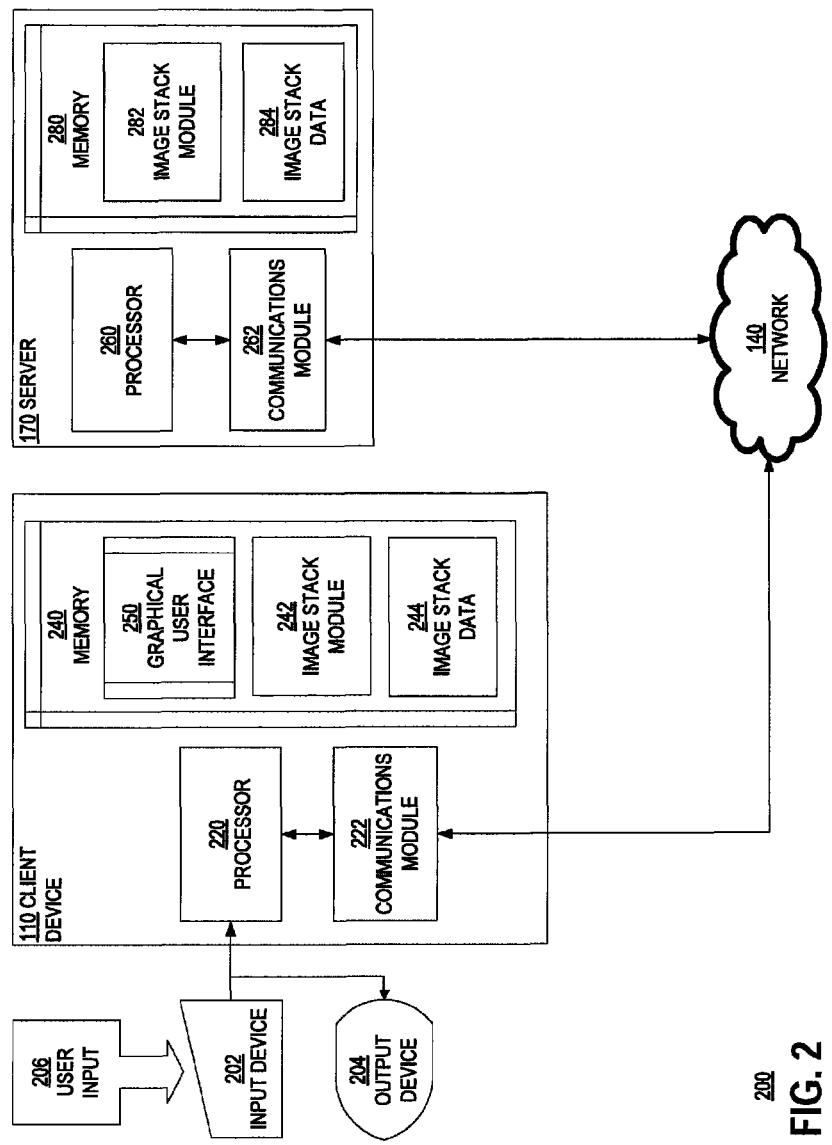
FIG. 2 is a block diagram illustrating an example of a client computing device and a server from the architecture of FIG. 1.

FIG. 2 is a block diagram 200 illustrating an example of a client computing device 110 and a server 170 in the architecture 100 of FIG. 1 according to certain aspects of the disclosure.

The client computing device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client computing device 110. The output device 204 can be a display screen. Input 206 received via the input device 202 can be processed locally on the client computing device 110 and/or the server 170.

The client computing device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which can be used by a user to interact with the client computing device 110 and/or the server 170, and can be used to display information to the user. The graphical user interface 250 may be installed locally at the client computing device 110 and/or downloaded from the server 170.

The memory 240 further includes software instructions which can be read by the processor 220, and include an image stack module 242. For example, the software instructions can include an operating system or an application (e.g., a web browser, a digital image management application), which includes the image stack module 242, and can be processed by the processor 220. Information generated or stored by the image stack module 242 can be stored as image stack data 244 in the memory 240.

The server 170 includes a memory 280, a processor 260, and a communications module 262. The memory 280 includes software instructions that can be read by the processor 260 to implement an image stack module 282. Information generated or stored by the image stack module 282 can be stored as image stack data 284 in the memory 280.

In one implementation, the image stack module 282 includes instructions for sharing digital edit operations. Upon reading the software instructions of the image stack module 282, the processor 260 is configured to store a first digital image edit stack (e.g., as image stack data 284), which includes at least one digital image edit operation performed by a first user of a social network upon a first digital image hosted on the social network. The processor 260 is further configured to include receiving indication of a first request for the first digital image edit stack, based upon an operation performed by a second user of the social network. The processor 260 is further configured to provide the digital image edit stack for the second user, in response to the received indication.

In another implementation, the image stack module 282 includes instructions for editing a digital image. Upon reading the software instructions of the image stack module 282, the processor 260 is configured to store a first digital image edit stack (e.g., as image stack data 284), which includes at least one digital image edit operation performed by a first user upon a first digital image. The processor 260 is further configured to receive indication of a first request for the first digital image edit stack, based upon an operation performed by a second user having access to the first digital image edit stack. The processor 260 is further configured to perform the digital image operation of the first digital image stack, upon a second digital image, in response to the received indication of the first request.

In yet another implementation, upon reading the software instructions of the image stack module 282, the processor 260 is configured to store a first digital image edit stack (e.g., as image stack data 284), which includes at least one digital image edit operation performed upon a first digital image. The processor 260 is further configured to receive via a social network, indication of a first request for the first digital image edit stack. The processor 220 is further configured to provide the first digital image edit stack, via the social network, in response to the received indication of the first request.

It should be noted that the while the subject technology described herein may be implemented as described above, other implementations may include a client computing device 110 in addition to, or instead of the server 170. That is, the operations described above with respect to the processor 260 of the server 170 may be carried out partially or completely by the processor 220 of the client computing device 110.

As explained above, the subject technology provides for sharing and/or applying digital image edit operations to one or more digital images, such as in the context of a user sharing digital images together with digital edit operations on a social network. However, the sharing and/or applying of digital image edit operations to digital images is not limited to this scenario, but may also be applicable in a variety of other scenarios, some of which are described below.

According to certain aspects, a photographer well known for his High Dynamic Range ("HDR") imaging can make his digital image edit stack(s) available, for example, not only on a social network (e.g., as a social network update), but also via email messages, rich site summary (RSS) posts, shared albums, and/or other mechanisms for sharing and/or displaying media. Others who subscribe to and/or are allowed to view the photographer's content (e.g., digital images with digital image edit operations applied thereto) may be provided with an option to download the photographer's digital image edit stack(s) in order to apply the same HDR effects to their own photographs. Thus, aspects of the subject technology provide a convenient way for users to view how certain digital edit operations appear on certain digital images, and to allow the users an option to download the digital edit operations should they desire to do so.

The underlying concepts that enable the above examples, and of course other examples, of sharing digital image edit operations are described below using the examples of processes 300A-C, illustrated in FIGS. 3A-C. As stated above, it should be noted that although processes 300A-C are described herein with reference to a server 170, the processes 300A-C are not limited to such, and can be performed by other configurations. For example, processes 300A-C can be performed on client computing device 110 instead of, or in conjunction with the server 170.

Furthermore, it should be noted that the terms "photograph" or "image" as used herein encompass their plain and ordinary meaning, including, but not limited to digital images captured using digital cameras, stills captured from video files, screen captures, digitized images created based on printed matter, and the like. That is, the terms "photograph" or "image" refer to a digital image file, regardless of how the digital image was created.

Figure 3A:
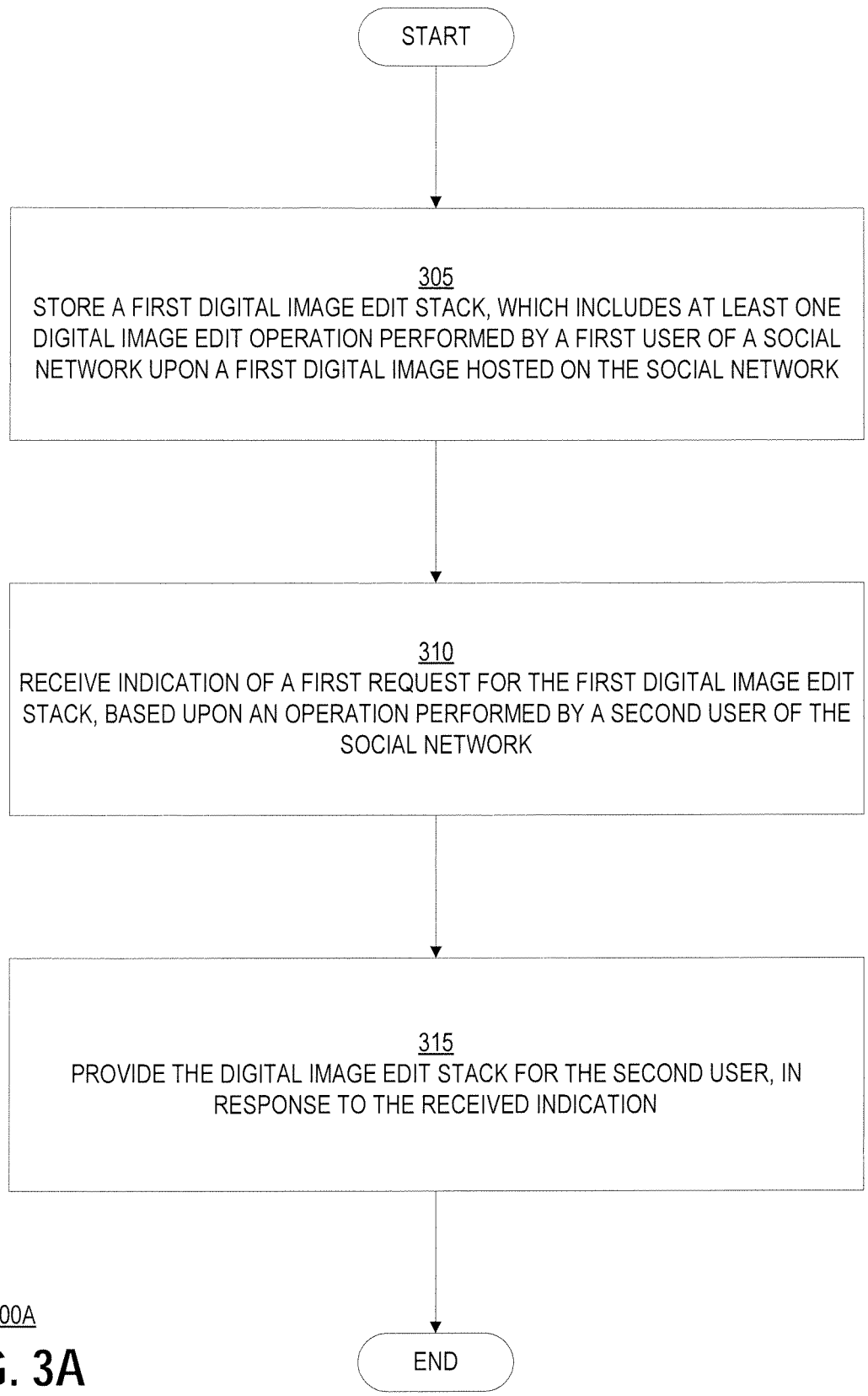
FIGS. 3A-C illustrate examples of processes for sharing digital image edit operations.
Figure 3B:
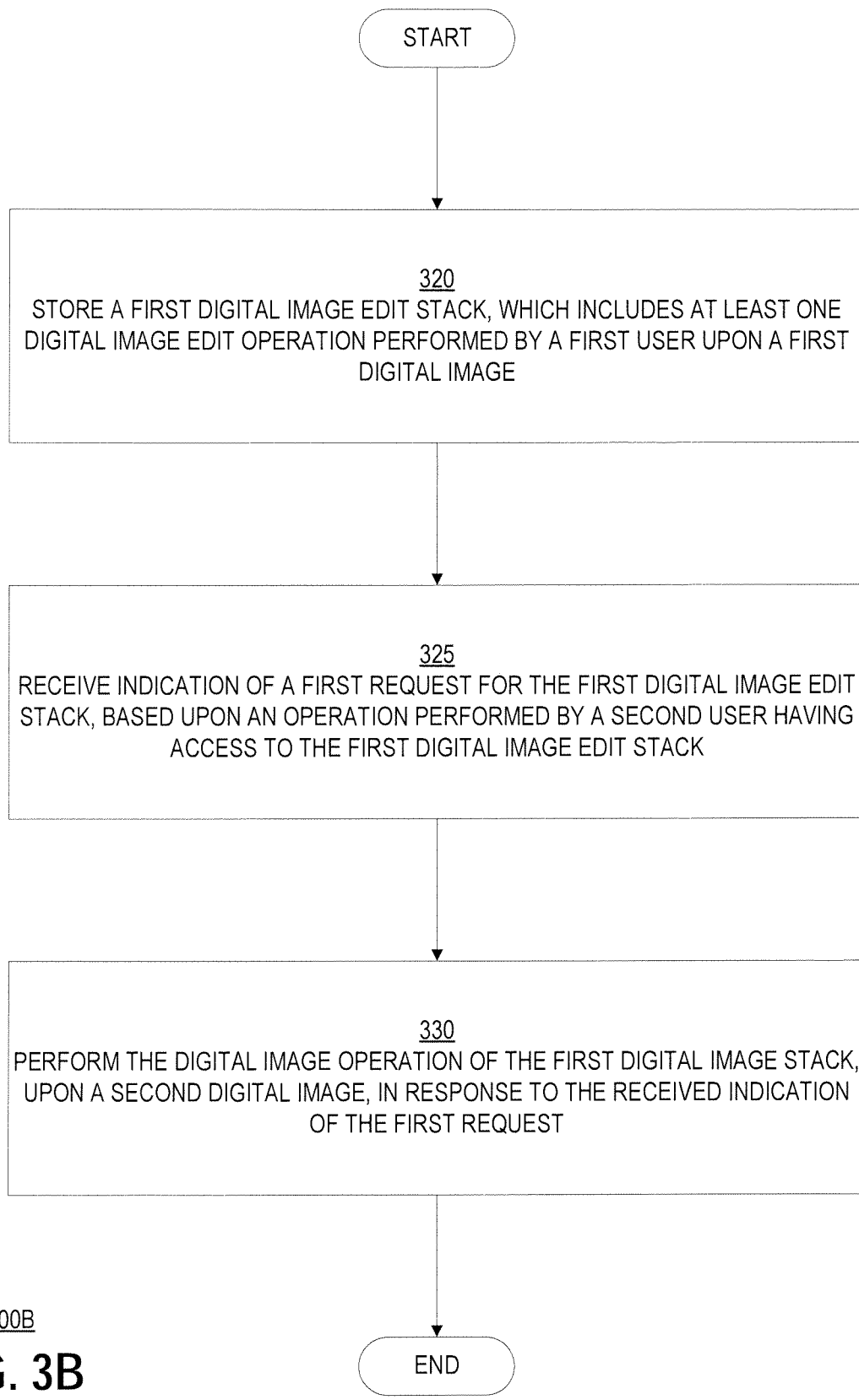
Figure 3C:
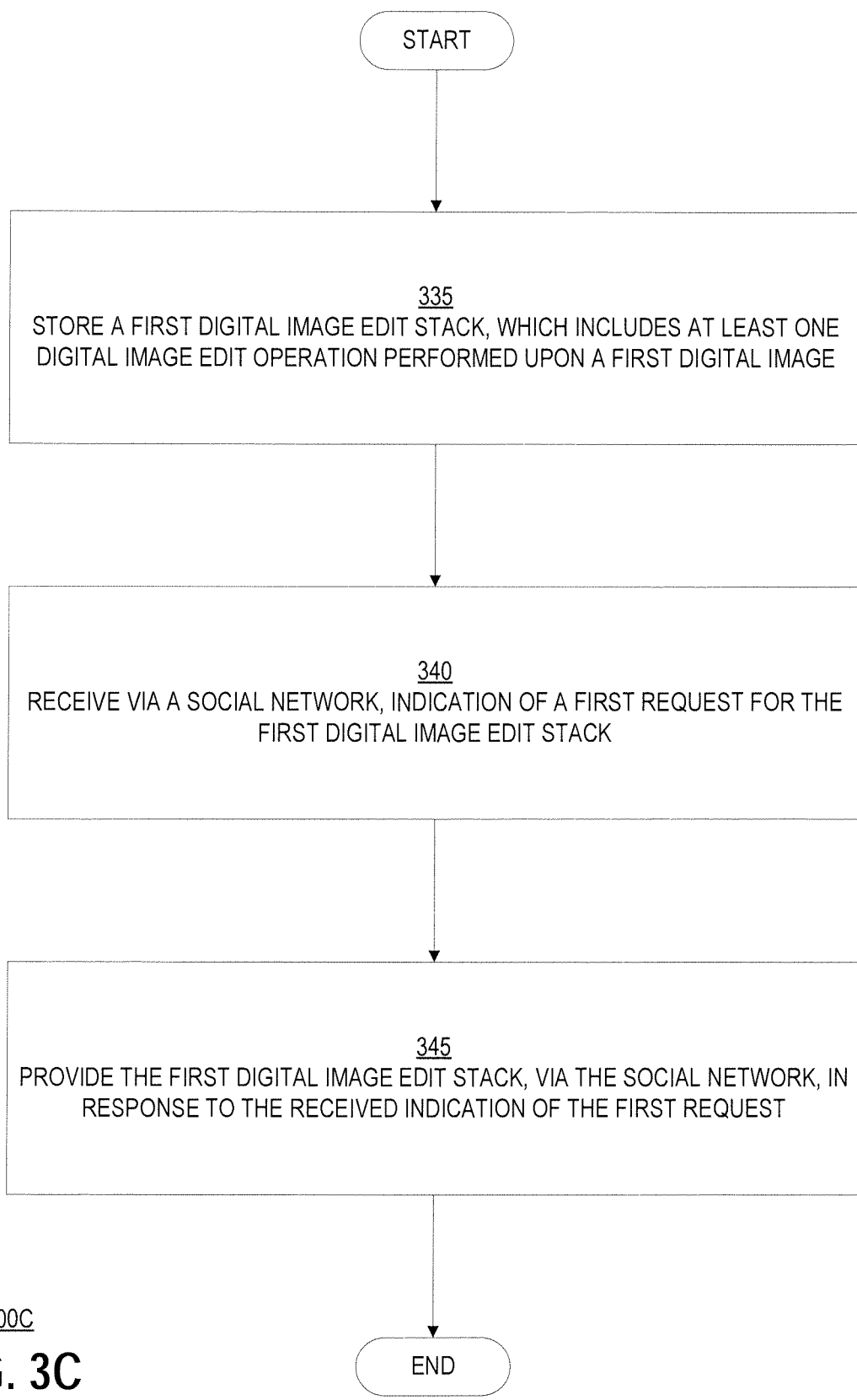
Figure 4:
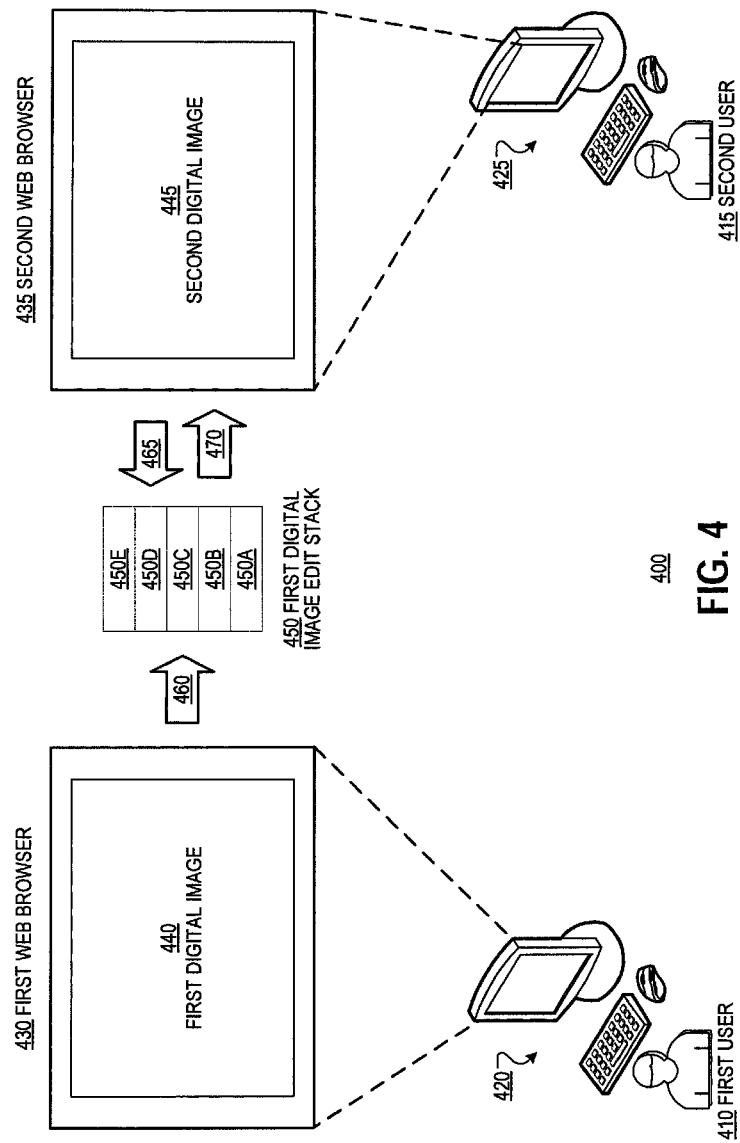
FIG. 4 illustrates the sharing of digital image edit operations using the examples of the processes of FIGS. 3A-C.

The processes 300A-C illustrated in FIGS. 3A-C are explained with reference to FIG. 4. FIG. 4 illustrates a first user 410 who is using a first desktop computer 420, which is an example of a client computing device 110 described above. The first user 410 is viewing a first web browser 430, which is an example of a graphical user interface 250 described above. The first user 410 is editing a first digital image 440 through the first web browser 430. In editing the first digital image 440, the first user 410 performs five edit operations 450A-E. FIG. 4 further illustrates a second user 415 who is using a second desktop computer 425, which is also an example of a client computing device 110 described above. The second user 415 is viewing a second web browser 435, which is also an example of a graphical user interface 250 described above. The second user 415 wishes to perform upon a second digital image 445, the same edit operations 450A-E as the first user 410 performed on the first digital image 440.

FIG. 3A illustrates an example of a process 300A for sharing digital image edit operations.

In Step 305, a first digital image edit stack is stored, which includes at least one digital image edit operation performed by a first user of a social network upon a first digital image hosted on the social network.

Referring to FIG. 4, when a first user 410 edits a first digital image 440, the various digital image edit operations 450A-E performed upon the first digital image 440 can be grouped and collectively stored as a first digital image edit stack 450.

In process 300A, the first digital image 440 is hosted on a social network. In a case where the social network is implemented using one or more servers 170, the first digital image 440 may be stored in a memory accessible by those servers 170. For example, the first digital image 440 may be stored in the memory 280 of one or more of the servers 170. As another example, the first digital image 440 may be stored in an external memory (e.g., a network attached storage, storage area network, cloud-based storage, and the like) which is accessible to the server(s) 170.

In another implementation, the first digital image 440 may be located in the memory (e.g., 240) of a the user's computer (e.g., 420), or in a memory (e.g., network attached storage, cloud-based storage, and so on) accessible by the user's computer.

Similarly, the first digital image edit stack 450 may be stored in a memory (e.g., 280) of a server (e.g., 170), a memory (e.g., 240) of a client computing device (e.g., 110), or a memory accessible by the client computing device and/or the server.

In this example, the first digital image edit stack 450 is stored in a memory 280 of a server 170 that is also providing the social network. In FIG. 4, the arrow 460 corresponds to Step 305 of process 300A.

In Step 310, an indication of a first request for the first digital image edit stack is received, based upon an operation performed by a second user of the social network.

The indication of the first request is represented in FIG. 4 by the arrow 465. In this example, the indication of the first request 465 for the first digital image edit stack 450 is received by the server 170. In another implementation, where the first desktop computer 420 and the second desktop computer 425 can communicate directly, for example, via a peer-to-peer connection, the indication of the first request 465 may be received by the first desktop computer 420.

The operation performed by the second user 415 of the social network, which causes the indication of the first request 465 to be received, can include as few as a single step. That is, the operation performed by the second user 415 can be a one-step operation.

A one-step operation can be a mouse click, a key press, or similar example of user input 206 provided via an input device 202. As an example, in a case where the second user 415 is viewing the first digital image 440, the second user 415 can perform a one-step operation to request the first digital image edit stack 450.

When the operation performed by the second user 415 includes more than one step, the additional steps can be directed to various aspects of the subject technology as it is implemented in that case. As one example, a request may include providing contact details of the second user 415. As another example, a request may include the second user 415 agreeing to subscribe to content (e.g., social network updates) of the first user 410.

In Step 315, the first digital image edit stack is provided for the second user, in response to the received indication. In FIG. 4, the arrow 470 corresponds to Step 315 of process 300A.

Referring to FIG. 4, the server 170 provides the first digital image edit stack 450 for the second user 415. The first digital image edit stack 450 can be provided for the second user 415 in a variety of approaches. For example, in one implementation, the second user 415 could be provided access to the first digital image edit stack 450. In another implementation, a copy of the first digital image edit stack 450 may be stored as a second digital image edit stack. In such an implementation, the second digital image edit stack may include some or all of the digital image edit operations (450A-E) of the first digital image edit stack 450.

In some implementations of the subject technology, the first digital image edit stack 450 may be applied to the second digital image 445 in response to the indication of the first request 465. That is, the operations 450A-E of the first digital image edit stack 450 may be performed on the second digital image 445 in response to the indication of the first request 465.

In other implementations, the first digital image edit stack 450 may be applied to the second digital image 445 in response to an indication of a second request for the first digital image edit stack 450, based upon a second operation performed by the second user 415 of the social network. That is, the operations 450A-E of the first digital image edit stack 450 may be performed upon the second digital image 445 in response to an indication of a second request for the first digital image edit stack 450 based upon a second operation performed by the second user 415 of the social network.

In some implementations, the second operation can be, for example, an acceptance or a confirmation provided in response to a request for user input (e.g., a dialog box). In other implementations, the second operation can be a request to apply the first digital image edit stack 450 to the second digital image 445.

FIG. 3B illustrates an example of a process 300B for editing a digital image.

In Step 320, a first digital image edit stack is stored, which includes at least one digital image edit operation performed by a first user upon a first digital image. Step 320 corresponds to arrow 460 in FIG. 4.

Step 320 of process 300B is similar to Step 305 of process 300A in that it relates to storing a first digital image edit stack which includes at least one digital image edit operation performed by a first user upon a first digital image. However, Step 320 of process 300B is different than Step 305 in that the first digital image may or may not be hosted on a social network.

Referring to FIG. 4, in an implementation corresponding to process 300B, the first digital image 440 may be stored on a server (e.g., 170) that may or may not be providing a social network. For example, the first digital image 440 may be stored on a client computing device 110 such as the first desktop computer 420. As another example, the first digital image 440 may be hosted on a website (e.g., a digital image editing website).

In Step 325, an indication of a first request for the first digital image edit stack is received, based upon an operation performed by a second user having access to the first digital image edit stack. Step 325 corresponds to arrow 465 in FIG. 4.

Step 325 is similar to Step 310 in that the indication of the first request 465 may be received through various means.

Furthermore, Step 325 is similar to Step 310 in that the operation performed by the second user 415 may be a one-step operation.

The second user 415 may have access to the first digital image stack in a variety of scenarios. For example, in an implementation where the first digital image 440 is hosted on a social network, the second user 415 may have access to the first digital image edit stack 450 based on access permissions associated with the first digital image edit stack 450. For example, the portion (e.g., web page) of the social network, where the first digital image edit stack 450 is stored, may have access permissions that allow access to the second user 415 regardless of whether the second user 415 is a user (e.g., registered user) of the social network or not a user (a non-user) of the social network. As another example, the second user 415 may have access to the first digital image edit stack 450 based on a social network between the second user 415 and the first user 410.

It should be noted that the social network link between the second user 415 and the first user 410 may be unidirectional or bidirectional. As an example of a unidirectional social network link, the second user 415 may be subscribed to content generated or shared by the first user 410, but first user 410 may not be subscribed to content generated or shared by the second user 415. A unidirectional social network link may be particularly useful in the scenario described earlier where a photographer might wish to share his digital image editing techniques using digital image edit stacks (e.g., 450). As an example of a bidirectional social network link, both the first user 410 and the second user 415 may be subscribed to content generated or shared by each other.

In Step 330, the digital image operation(s) of the first digital image stack are performed upon a second digital image, in response to the received indication of the first request. In FIG. 4, the arrow 470 corresponds to Step 330 of process 300B.

As described above with reference to Step 315, in some implementations of the subject technology, the first digital image edit stack 450 may be applied to the second digital image 445 in response to the indication of the first request 465. That is, the operations 450A-E of the first digital image edit stack 450 may be performed on the second digital image 445 in response to the indication of the first request 465.

Similarly, as described above, in other implementations, the first digital image edit stack 450 may be applied to the second digital image 445 in response to an indication of a second request for the first digital image edit stack 450, based upon a second operation performed by the second user 415. That is, the operations 450A-E of the first digital image edit stack 450 may be performed upon the second digital image 445 in response to an indication of a second request for the first digital image edit stack 450, based upon a second operation performed by the second user 415.

In some implementations, the second operation can be, for example, an acceptance or a confirmation provided in response to a request for user input (e.g., a dialog box). In other implementations, the second operation can be a request to apply the first digital image edit stack 450 to the second digital image 445.

It should be noted that one or both of the first digital image 440 and the second digital image 445 may be hosted on a social network, a website (e.g., an image sharing website), a server 170 in some other configuration, or a client computing device 110 such as the first desktop computer 420 or the second desktop computer 425. Thus, the location of the first digital image 440 and the second digital image 445 may not be the same or similar. So long as the second user 415 has access to the first digital image edit stack 450, the second user may perform an operation that may cause, in response to an indication of that operation, the first digital image edit stack 450 to be applied to the second digital image 445.

FIG. 3C illustrates an example of a process 300C for sharing digital image edit operations. In Step 335, a first digital image edit stack is stored. The first digital image edit stack includes at least one digital image edit operation performed upon a first digital image. Step 335 corresponds to arrow 460 in FIG. 4.

Step 335 is similar to each of Step 305 and Step 320. Referring to FIG. 4, in an implementation corresponding to process 300C, the first digital image 440 may be stored on a server (e.g., 170) that may or may not be providing a social network. For example, the first digital image 440 may be hosted on a social network. As another example, the first digital image 440 may be stored on a client computing device 110 such as the first desktop computer 420. And, as yet another example, the first digital image 440 may be hosted on a website (e.g., a digital image editing website).

The digital image edit operations 450A-E of the first digital image edit stack 450 may be performed by a first user 410 who may be a user of a social network. That is, the digital image edit operations 450A-E of the first digital image edit stack may be performed by a first social network user 410.

In Step 340, an indication of a first request for the first digital image edit stack is received via a social network. Step 340 corresponds to arrow 465 in FIG. 4.

Step 340 is similar to each of Step 310 and 325 in that the indication of the first request 465 may be received. In an implementation corresponding to process 300C, the indication of the first request 465 for the first digital image edit stack 350 may be received via a social network.

The indication of the first request 465 may be received via the social network in a variety of scenarios.

For example, the indication of the first request 465 may be received based on an operation performed by the first user 410 or the second user 415. As another example, the indication of the first request may be received based on an operation performed by a client computing device 110, or a server 170 (e.g., a server 170 providing the social network).

In some instances, an indication of the first request 465 may be received by a software program (e.g., an application, an operating system) on a client computing device 110 (e.g., 420) on which the digital image edit operations 450A-E of the first digital image edit stack 450 are performed. In other instances, the indication of the first request 465 may be received by a software program (e.g., an application, an operating system) on a second client computing device 110 (e.g., 425), or a server 170.

In Step 345, the first digital image edit stack is provided via the social network, in response to the received indication of the first request. In FIG. 4, the arrow 470 corresponds to Step 345 of process 300C.

Step 345 is similar to Step 315 in that the first digital image edit stack 450 is provided in response to the received indication of the first request 465.

The first digital image edit stack 450 may be provided for a user (e.g., 410, 415). As described above with respect to Step 315, providing the first digital image edit stack 450 can include providing access to the first digital image edit stack 450. Similarly, as described above with respect to Step 315, a copy of the first digital image edit stack 450 may be stored as a second digital image edit stack. In such an implementation, the second digital image edit stack may include some or all of the digital image edit operations (450A-E) of the first digital image edit stack 450.

In some implementations of the subject technology, the first digital image edit stack 450 may be applied to the second digital image 445 in response to the indication of the first request 465. That is, the operations 450A-E of the first digital image edit stack 450 may be performed on the second digital image 445 in response to the indication of the first request 465.

In other implementations, the first digital image edit stack 450 may be applied to the second digital image 445 in response to an indication of a second request for the first digital image edit stack 450 based upon a second operation. That is, the operations 450A-E of the first digital image edit stack 450 may be performed upon the second digital image 445 in response to an indication of a second request for the first digital image edit stack 450 based upon a second operation. The second operation may be performed by the first user 410 or the second user 415. As another example, the second operation may be performed by a client computing device 110 or a server 170 (e.g., a server 170 providing the social network).

In some implementations, the second operation can be, for example, an acceptance or a confirmation provided in response to a request for user input (e.g., a dialog box). In other implementations, the second operation can be a request to apply the first digital image edit stack 450 to the second digital image 445.

Figure 5:
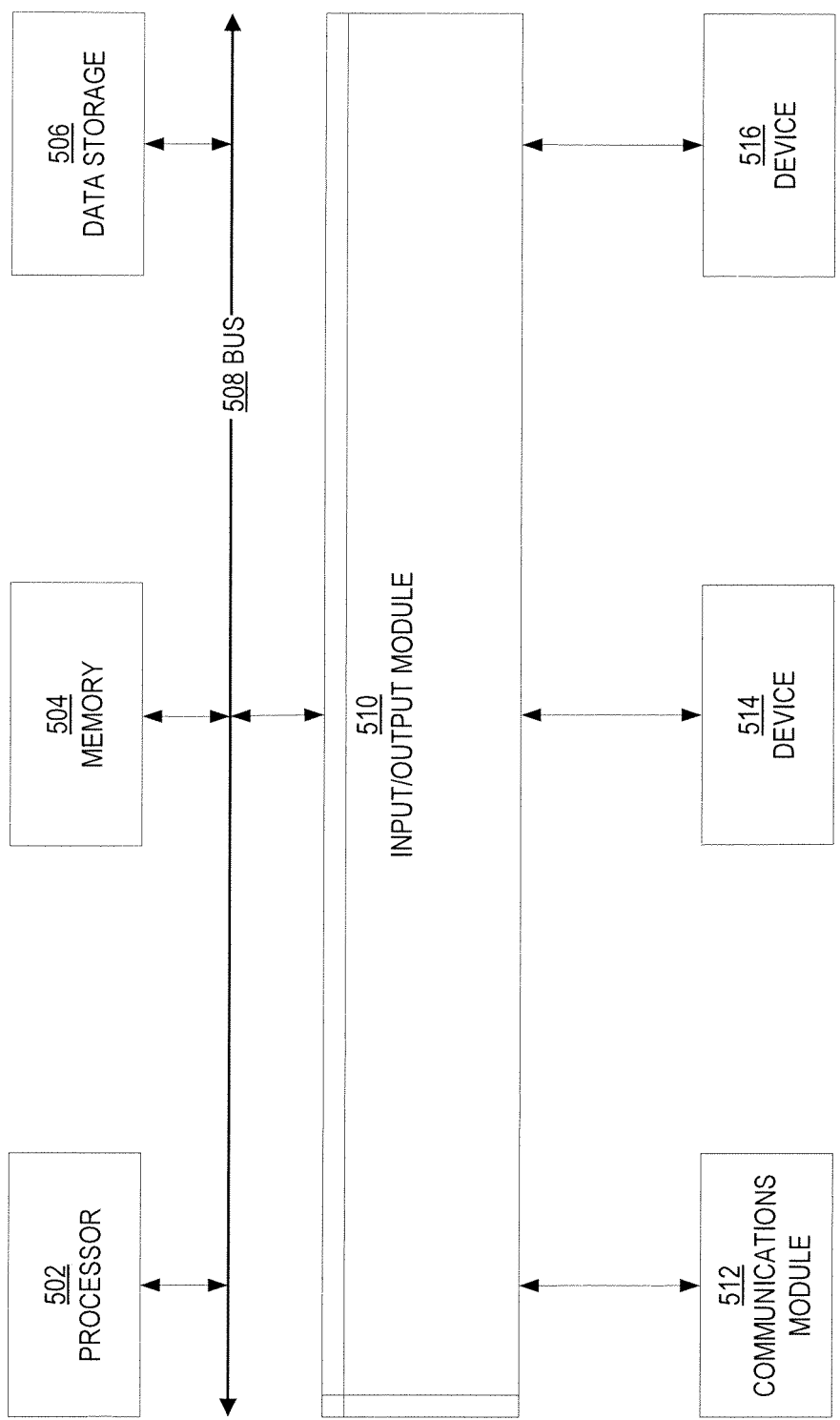
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk, optical disk, or solid state disk coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include client computing devices and servers. A client computing device and server are generally remote from each other and typically interact through a communication network. The relationship of client computing device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for sharing digital image edit operations, the method comprising:
    storing a first digital image edit stack, the first digital image edit stack comprising at least one digital image edit operation performed by a first user of a social network upon a first digital image hosted on the social network;
    receiving indication of a first request for the first digital image edit stack, based upon an operation performed by a second user of the social network;
    providing, in response to the received indication, the first digital image edit stack for the second user; and
    performing upon a second digital image, in response to indication of a second request for the first digital image edit stack, the at least one digital image edit operation of the first digital image edit stack, wherein the indication of the second request is based upon a second operation performed by the second user of the social network.

2. The computer-implemented method of claim 1, wherein the operation performed by the second user is a one-step operation for requesting the first digital image edit stack.

3. The computer-implemented method of claim 1, wherein the providing comprises:
    providing access to the first digital image edit stack for the second user.

4. The computer-implemented method of claim 1, wherein the providing comprises:
    storing as a second digital image edit stack, a copy of the first digital image edit stack, wherein the second digital image edit stack comprises the at least one digital image edit operation.

5. A system for editing a digital image, the system comprising:
    a memory comprising instructions for editing a digital image; and
    a processor configured to execute the instructions to:
        store a first digital image edit stack, the first digital image edit stack comprising at least one digital image edit operation performed by a first user upon a first digital image;
        receive indication of a first request for the first digital image edit stack, wherein the indication is based upon an operation performed by a second user having access to the first digital image edit stack; and
        perform upon a second digital image, the at least one digital image edit operation of the first digital image edit stack, in response to the received indication of the first request.

6. The system of claim 5, wherein at least one of the first digital image or the second digital image is hosted on a social network.

7. The system of claim 5, wherein the first digital image is hosted on a social network, and wherein the second user has access to the first digital image edit stack based on access permissions associated with the first digital image edit stack.

8. The system of claim 7, wherein the access permissions associated with the first digital image edit stack allows a non-user of the social network to have access to the first digital image edit stack.

9. The system of claim 7, wherein the access permissions associated with the first digital image edit stack are based on a social network link between the second user and the first user.

10. The system of claim 9, wherein the social network link between the second user and the first user is at least one of a bidirectional social network link or a unidirectional social network link.

11. The system of claim 5, wherein the operation performed by the second user is a one-step operation for requesting the first digital image edit stack.

12. A non-transitory machine-readable storage medium comprising machine-readable instructions for causing a processor to execute a method for sharing digital image edit operations, the method comprising:
    storing a first digital image edit stack, the first digital image edit stack comprising at least one digital image edit operation performed by a first user of a social network upon a first digital image hosted on the social network;

receiving indication of a first request for the first digital image edit stack, based upon an operation performed by a second user of the social network;

providing, in response to the received indication, the first digital image edit stack for the second user; and performing upon a second digital image, in response to indication of a second request for the first digital image edit stack, the at least one digital image edit operation of the first digital image edit stack, wherein the indication of the second request is based upon a second operation performed by the second user of the social network.

13. The non-transitory machine-readable storage medium of claim 12, wherein the operation performed by the second user is a one-step operation for requesting the first digital image edit stack.

14. The non-transitory machine-readable storage medium of claim 12, wherein the providing comprises providing access to the first digital image edit stack.

15. The non-transitory machine-readable storage medium of claim 12, wherein the providing comprises:

storing as a second digital image edit stack, a copy of the first digital image edit stack, wherein the second digital image edit stack comprises the at least one digital image edit operation.

* * * * *